(12) United States Patent
Caminada et al.

(10) Patent No.: US 12,157,563 B2
(45) Date of Patent: Dec. 3, 2024

(54) CONNECTION BETWEEN A PITCH CONTROL UNIT ARM AND A PITCH HORN

(71) Applicant: Kopter Group AG, Mollis (CH)

(72) Inventors: Mario Caminada, Ernetschwil (CH); Michal Skrzynski, Zürich (CH)

(73) Assignee: KOPTER GROUP AG (CH)

( * ) Notice: Subject to any disclaimer, the term of this patent is extended or adjusted under 35 U.S.C. 154(b) by 0 days.

(21) Appl. No.: 17/923,430

(22) PCT Filed: Apr. 23, 2021

(86) PCT No.: PCT/EP2021/060670
§ 371 (c)(1),
(2) Date: Nov. 4, 2022

(87) PCT Pub. No.: WO2021/224027
PCT Pub. Date: Nov. 11, 2021

(65) Prior Publication Data
US 2023/0192283 A1    Jun. 22, 2023

(30) Foreign Application Priority Data

May 6, 2020 (CH) .................................. 00538/20

(51) Int. Cl.
*B64C 27/82* (2006.01)
*B64C 27/59* (2006.01)
(Continued)

(52) U.S. Cl.
CPC .............. *B64C 27/82* (2013.01); *B64C 27/59* (2013.01); *F16C 11/0614* (2013.01);
(Continued)

(58) Field of Classification Search
None
See application file for complete search history.

(56) References Cited

U.S. PATENT DOCUMENTS 3,594,097 A * 7/1971 Mouille ................. B64C 27/82
416/104
5,306,119 A   4/1994 Bandoh et al.
(Continued)

FOREIGN PATENT DOCUMENTS

DE    1756264      3/1970
EP    0604299 A1   6/1994
(Continued)

OTHER PUBLICATIONS

English language machine translation of EP0604299A1 from Espacenet of the European Patent Office.
(Continued)

*Primary Examiner* — Juan G Flores
(74) *Attorney, Agent, or Firm* — Lerner David LLP (57) ABSTRACT

A detachable connection between a pitch control unit arm and a pitch horn of a blade holder in a tail rotor head of a tail rotor of a rotary wing aircraft includes a pin connecting the pitch horn, attached to a blade holder, with the pitch control unit arm of a pitch control unit, by protruding through an arm through hole and at another edge through a pitch horn through hole. By this arrangement, material wear is reduced and maintenance intervals can be reduced. This is reached because the pin is designed as a sliding pin projecting between pitch horn and pitch control unit arm, which is running in the course of its length through a spherical bearing in form of a ball with a central ball through hole.

15 Claims, 6 Drawing Sheets

(51) Int. Cl.
*F16C 11/06* (2006.01)
*F16C 31/00* (2006.01)
*F16C 33/04* (2006.01)
*F16C 33/12* (2006.01)
*F16C 33/20* (2006.01)

(52) U.S. Cl.
CPC .......... *F16C 11/0695* (2013.01); *F16C 31/00* (2013.01); *F16C 33/043* (2013.01); *F16C 33/128* (2013.01); *F16C 33/203* (2013.01); *B64C 2027/8254* (2013.01); *F16C 2208/02* (2013.01); *F16C 2326/43* (2013.01)

(56) References Cited

U.S. PATENT DOCUMENTS

| | | | |
|---|---|---|---|
| 5,383,767 | A | 1/1995 | Aubry |
| 8,662,847 | B2 | 3/2014 | Kuntze-Fechner |
| 9,592,917 | B2 * | 3/2017 | Cassagne ............... B64D 27/12 |
| 10,371,200 | B2 * | 8/2019 | Riedl ........................ F16F 1/40 |
| 2015/0166189 | A1 * | 6/2015 | Cassagne .............. F16C 11/045 244/54 |
| 2019/0170188 | A1 * | 6/2019 | Riedl ..................... F16C 11/083 |
| 2020/0102081 | A1 * | 4/2020 | Tulloch ............... F16C 11/0609 |

FOREIGN PATENT DOCUMENTS

| | | |
|---|---|---|
| EP | 0680876 A1 | 5/1995 |
| EP | 3628594 A1 | 4/2020 |
| JP | H06219396 A | 8/1994 |
| WO | WO93/02916 | 2/1993 |

OTHER PUBLICATIONS

English language machine translation of DE1756264A1 from Espacenet of the European Patent Office.
English language machine translation of EP0680876A1 from Espacenet of the European Patent Office.
International Search Report for PCT/EP2021/060670.
Office Action for Japanese Application No. 2022-567098 mailed Aug. 30, 2024. 2 pgs.

* cited by examiner

CONNECTION BETWEEN A PITCH CONTROL UNIT ARM AND A PITCH HORN

CROSS REFERENCE TO RELATED APPLICATIONS

This application is a national phase entry of PCT/EP2021/060670, filed Apr. 23, 2021 which claims priority to Swiss patent application 00538/20, filed on May 6, 2020, the contents of both of which are herein incorporated by reference

BACKGROUND OF THE INVENTION

Field of the Invention

The present invention relates to a detachable connection between a pitch control unit arm and a pitch horn of a blade holder in a tail rotor head of a tail rotor of a rotary wing aircraft. The detachable connection comprises a pin connecting the pitch horn attached to a blade holder with the pitch control unit arm of a pitch control unit, by protruding through an arm through a hole and at another edge through a pitch horn through a hole, and a tail rotor head of a tail rotor of a rotary wing aircraft, comprising a pitch control unit with a multiplicity of pitch control unit arms, a multiplicity of blade holder with connected tail rotor blades, wherein each blade holder is connected to each pitch control unit arm via a connection and use of a sliding pin, comprising a pin fixing washer, a castellated nut and a threaded end with a spherical bearing, as well as a tail rotor for a rotary wing aircraft.

Description of Related Art

From U.S. Pat. No. 7,604,460 a tail rotor or helicopter antitorque rotor is known, comprising a tail rotor head and multiplicity of rotor blades attached by associated rotor blade holder and tension torsion straps. Each of the rotor blade holders comprises a pitch horn which is to be connected to a pitch control unit arm or control rod. As disclosed in U.S. Pat. No. 7,604,460, a screw is used for fixation, by the screw running between the pitch horn and the pitch control unit arm, while protruding through a through hole in the pitch horn and the pitch control unit arm. The result is a rigid connection of the screw and the pitch horn, in order to absorb centrifugal forces during operation, as well as being a means of rotation of the tail rotor rotation axis. The pitch control arm through hole moves in the special tip of the screw. It is a cylinder, bush in the pitch control unit arm, to ball, tip of the screw connection. While the pitch control unit swivels the pitch control unit arms, and therewith the pitch horns of each blade holder, loads the screw via high forces which increases the need to maintain this component. This screw can be regarded as a weak point of the fastening which requires increased attention. In practice, this screw has already broken, so that the even pivoting of all blades is no longer guaranteed. So far, no great importance has been attached to this connection. The spherical surface of the bush fixed with the screw rubs against a cylindrical tube surface in the spider. This creates a point or line contact which is causing a lot of wear.

Also, other prior art documents have not taken any special precautions to provide a sufficiently stable attachment between pitch horn and pitch control unit arm and in particular pitch control unit. The result is a connection that is susceptible to mechanical failure and, to be on the safe side, requires frequent maintenance. To make things worse, maintenance, and in particular exchange of the screw between pitch horn and pitch control unit arm, is connected with removal of other parts and up to now is anything but easy, requiring extensive dismounting, including the disassembly of tail rotor.

BRIEF SUMMARY OF THE INVENTION

An object of the present invention is to create a tail rotor head of a rotary wing aircraft and an optimized connection between a pitch control unit arm and a pitch horn of a blade holder for a tail rotor head, whereby material wear is reduced, maintenance intervals can be reduced and a simplified maintenance of mechanically more robust components is reached.

By introducing sliding pins and spherical bearings, a more simplified maintenance of the tail rotor head, and therewith of the rotary wing aircraft, can be reached. To simplify and speed up maintenance tasks on a rotorcraft counter torque device, a special kind of sliding pin is intended.

No further components, such as rotor blades, rotor hubs or control spiders have to be removed or disassembled to inspect or replace a sliding pin, which is accessible at any time from the outside of the tail rotor head and in particular the tail rotor hub.

BRIEF DESCRIPTION OF THE SEVERAL VIEWS OF THE DRAWINGS

Further advantages, features, and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination received, but also in other combinations on their own, without departing from the scope of the disclosure.

The subject of the invention is described in detail below in connection with the attached drawings. Necessary features, details and merits of the invention are derived from this description below, whereby a preferred embodiment of the invention and some additional features or optional features are listed in detail.

Variations of combinations of features or minor adaptations of the invention are to be found in the detailed description, illustrated in the figures and included in the dependent claims. The person skilled in the art understands that all combinations of features of the patent claims presented here can be applied.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that at least one of "A, B, and C" should not be understood as including only one of A, only one of B, only one of C, or any combination of A, B, and C.

Figure 1:
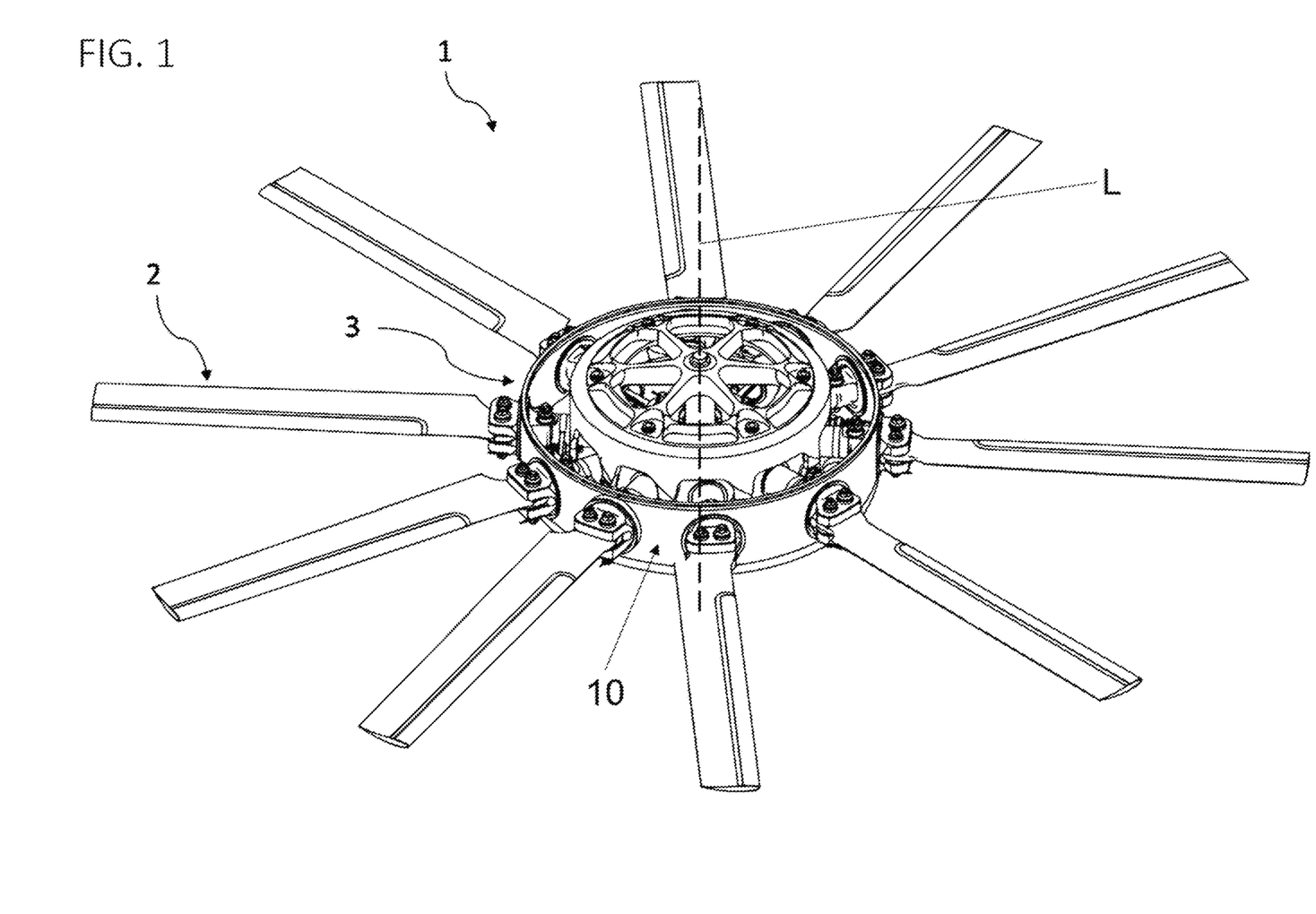
FIG. 1 depicts a perspective general view of a tail rotor with tail rotor blades attached, while an optional shroud has been removed.

A rotor 1 of a rotary wing aircraft is shown in FIG. 1, by way of example a tail rotor 1, without a common circumferential shroud enveloped spaced apart from the axis of rotation L. In the center of the tail rotor 1, a tail rotor head 3 comprising a multiplicity of parts is shown. Here only a hub 10 without a covering hub cap is visible. A multiplicity of tail rotor blade holders is attached to the tail rotor head 3. Tail rotor blades 2 are directly attached to the blade holders and therewith indirectly with the tail rotor head 3.

Figure 2A:
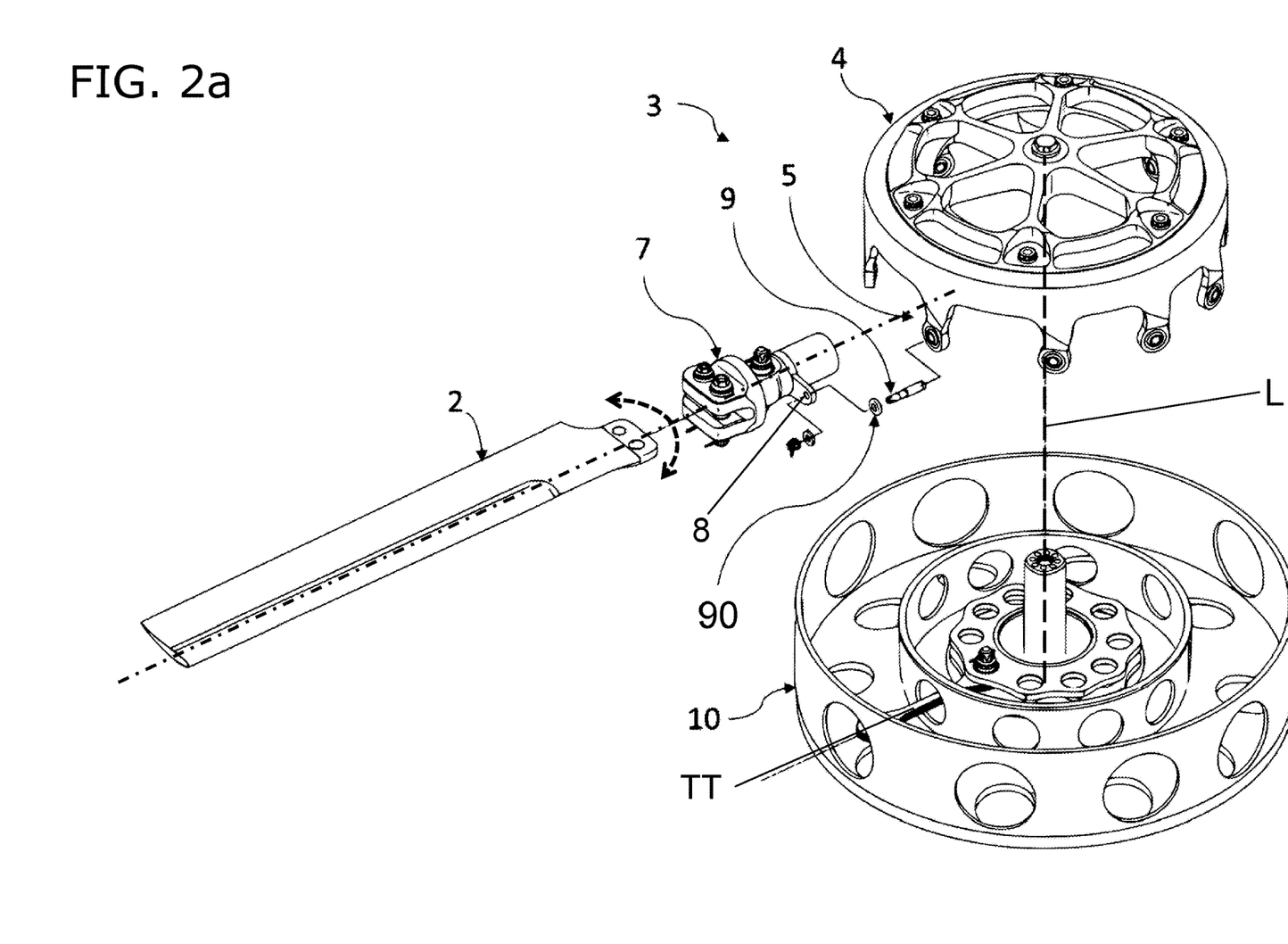
FIG. 2a depicts an explosive view of a tail rotor with partly deconstructed tail rotor head, a tail rotor blade, a blade holder, a pitch control unit and a tension torsion strap.

The exploded view FIG. 2a depicts the components of the rotor head 3 in more detail, whereby, for example, only the attachment of one rotor blade 2 by means of one blade holder 7 over a tension torsion strap TT on a rotor hub 10 and a pitch control unit 4 is shown. The tail rotor head 3 is at least formed by a hub 10, a pitch control unit 4, a number of tension torsion straps TT, according to the later attached blade holder 7 and tail rotor blades 2. In operation, a signal from a control system of the rotary wing aircraft is transferred, via the pitch control unit 4 and a multiplicity of pitch control unit arms 5 via the rotor blade holders 7, to the tail rotor blades 2. The tension torsion straps TT are fixed with one of their connection eyes at the hub 10, each protruding through an assigned hole in the hub 10. The hub 10 provides support for the multiplicity of blade holder 7.

The pitch control unit 4 will be placed, partly reaching inside the hub 10, showing pitch control unit arms 5 for connecting a part of the tail rotor blade holder 7. The pitch control unit 4 also shows openings or recesses, such that the blade holder 7 can protrude in radial direction.

Each blade holder 7 is connectable at an assigned tension torsion strap TT and at an assigned pitch control unit arm 5 of the pitch control unit 4. After attachment of the blade holder 7 indirectly at the hub 10, a hub cap can be used to cover the hub 10. A part of the blade holder 7 protrudes from the hub 10. With for example two bolts, each tail rotor blade 2 is fixed at their assigned blade holder 7, wherein at least one bolt is necessary. The connection between the blade holder 7 and the hub 10 is reached via the tension torsion straps TT.

Here the blade holder 7 comprises a strap holding part and a blade holding part, which are molded together at a linear distance from one another. However, the design of the holder may also be done in other ways. The tension torsion strap TT is detachably connected to the blade holder 7. The connection between the blade holder 7 and the pitch control unit 4 is reached by connecting a pitch horn 8 at each pitch control unit arm 5, using at least one sliding pin 9 and a pin fixing washer 90, sliding pin 9 protruding to the control unit arm 5. Such a connection makes a later pivoting of the blade 2 possible, as indicated with the double arrow, around the blade span axis, allowing transmission of rotary movements from the pitch control unit 4 to the blade holder 7. The washer 90 is an optionally removable component and may be replaced by an integrated shape of the pitch horn 8.

Figure 2B:
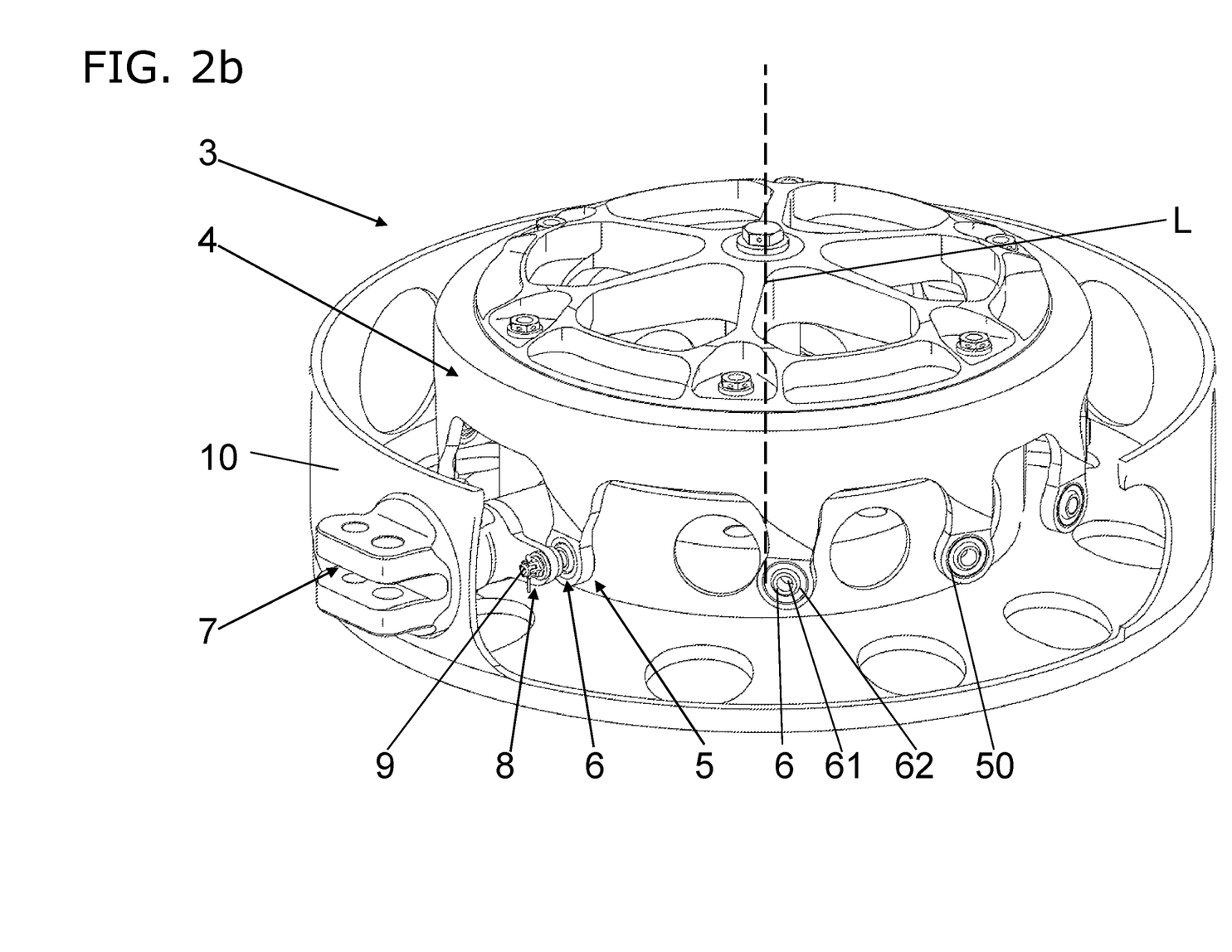
FIG. 2b depicts a perspective view of a tail rotor head, partly cut and details of connection of a pitch horn at a pitch control unit arm.

In the partial section view of FIG. 2b, the assembled tail rotor head 3 is shown, without tail rotor blades 2. To reduce material wear, create more robust parts and extend maintenance intervals, the detachable connection between the pitch control unit arm 5 and the pitch horn 8 of the blade holder 7 is optimized as described in the following in more detail.

To reach the detachable connection, the sliding pin 9 is held via a spherical bearing, comprising a ball 6, inside each pitch control unit arm 5. Each pitch control unit arm 5 includes an arm through-hole 50, in which the spherical bearing in form of a ball 6 with ball through hole 61 and a ring-like outer race 60 of the spherical bearing is inserted. This spherical bearing could in another embodiment also be placed into the pitch horn through hole 80, whereby this solution is to be understood according to the solution described here.

Figure 3A:
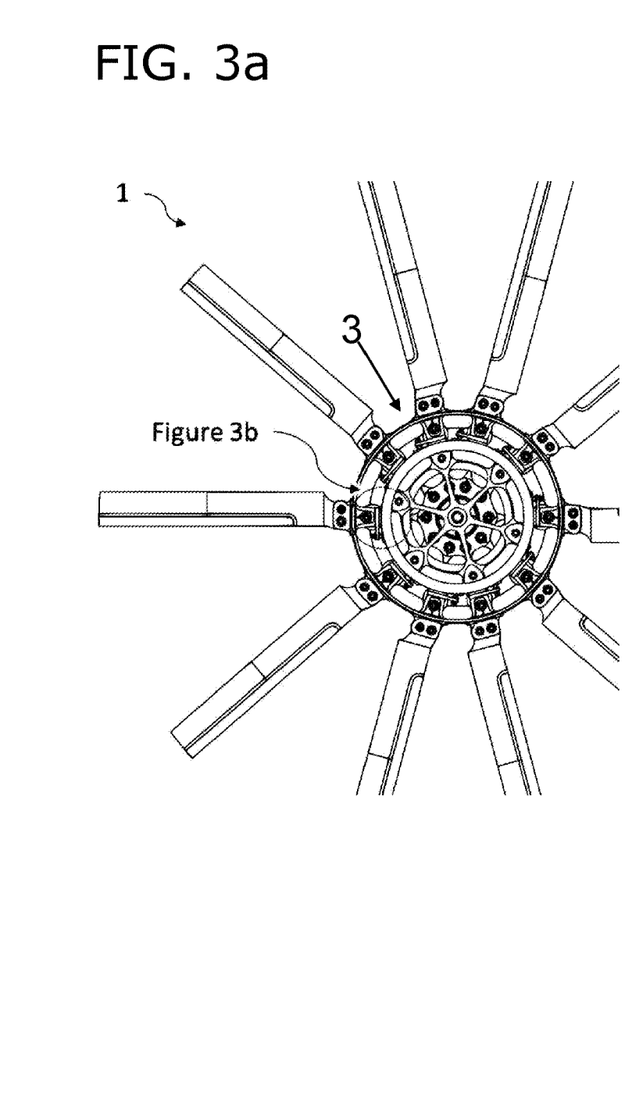
FIG. 3a depicts a part of a top view of a tail rotor head.
Figure 3B:
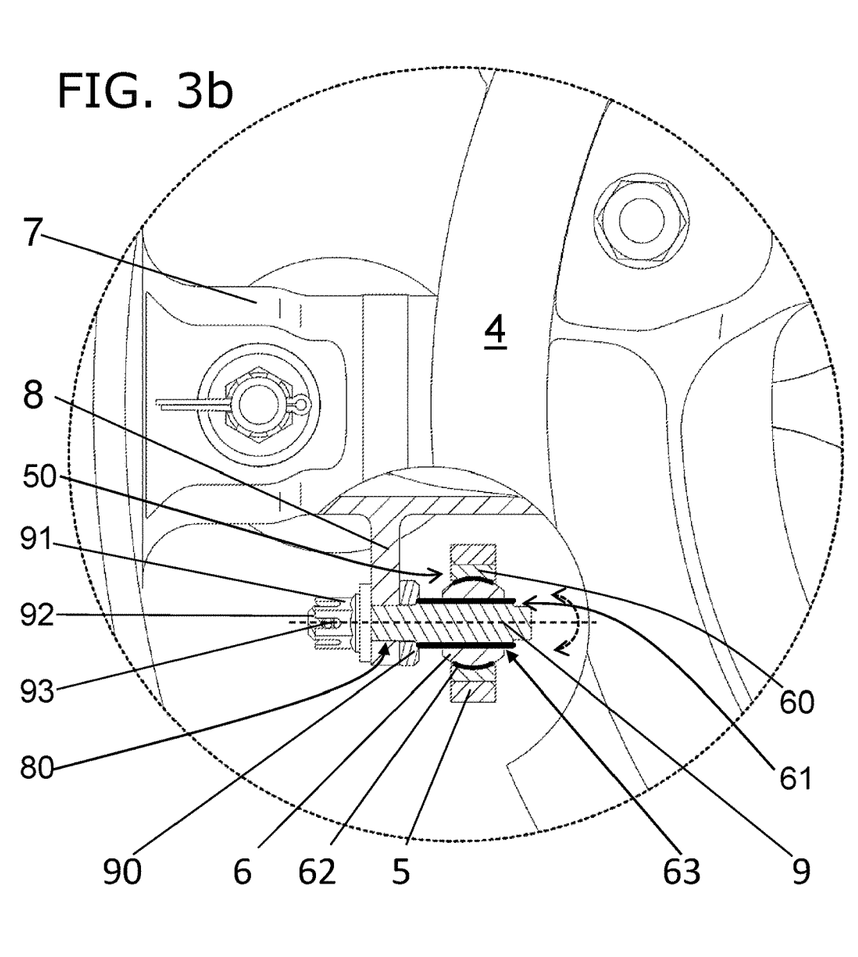
FIG. 3b depicts a detailed partly cut detail top view of a section of the connection area between blade holder and pitch control unit.

FIG. 3a depicts an overview of the tail rotor 1 with multiple tail rotor blades 2 connected to the tail rotor head 3. FIG. 3b depicts a partially cut detail top view of the connection between pitch horn 8 and pitch control unit arm 5. As shown, the pitch horn 8 is detachably connected with the pitch control unit arm 5 via the sliding pin 9.

The sliding pin 9 can be held by the pin fixing washer 90 between pitch horn 8 and pitch control unit arm 5. The sliding pin 9 protrudes between these components through a pitch horn through hole 80 in the pitch horn 8, running through a ball through hole 61 in the spherical bearing 6 and emerges from the ball 6 facing the pitch control unit 4. The ball 6 is arranged centrally in the arm through hole 50 and is surrounded therein by the outer race 62 of the spherical bearing. The outer race 62 is fixed in the arm through hole 50. The sliding pin 9 is thus detachably mounted traversing the pitch horn through hole 80 and the arm through hole 50 completely.

At one side, the sliding pin 9 comprises a threaded end 92 which can be effectively linked with a nut 91, for example a castellated nut 91, to be secured with a detachable pin connection. Through a hole 93 for detachable pin in the sliding pin 9, the detachable pin connection can be made with a pin, which is not shown in FIG. 3b. Also, a self-locking nut could be used instead of the castellated nut 91, because it is often challenging and time-consuming, in maintenance, to install and remove cotter pins needed for castellated nuts 91.

After fixing the sliding pin 9, it can be swiveled slightly with respect to the pitch control unit arm 5, as indicated by the double arrow. The sliding pin 9 and the ball 6 are arranged to slide by a movement of the ball 6 along a first sliding surface 62 at the outer surface of the ball 6, which is in contact to an inner surface of the outer race 60 of the spherical bearing, leading to a swivel movement or pivoting motion of sliding pin 9 and ball 6 relatively to the pitch control unit arm 5. The inner surface of the outer race 60 is the surface pointing towards the center of the arm through hole 50.

If the spherical bearing would be placed inside the pitch horn through hole 80, an analogous pivoting motion would occur.

Due to a second sliding surface 63 at the inside surface of the ball through hole 61 and the outer surface of the sliding pin 9, the sliding pin 9 can slide in the ball through hole 61 linearly to a small extent and in a direction of the length axis of the sliding pin 9. The enabling of an axial movement of the sliding pin 9 inside the ball through hole 61 is due to centrifugal force pulling out the pitch control unit arm 5. A sliding needs to be enabled because relative displacement between pin and ball occurs whenever the yaw input from pilot arrives.

Sufficient fastening of the sliding pin 9 is achieved at all times. The sliding pin 9 cannot slip out of the pitch horn 8 through hole 80 and pitch control unit arm 5 through hole 50 after fixing with the here described detachable pin connection.

The first sliding surface 62 between ball 6 and outer race 60 allows rotation and in particular the swivel movement of the ball 6 in the outer race 60. Both parts, ball 6 and outer race 60, are integral parts of the spherical bearing.

Instead of placing the second sliding surface 63 on the outer surface of the sliding pin 9, it could be as well attached to the bore 61 in the ball 6 of spherical bearing. The second sliding surface 63 allows axial displacement between the sliding pin 9 and the ball 6 of the spherical bearing. The second sliding surface 63 can be an integral part of the sliding pin 9 or can be bonded or applied to the sliding pin 9. It can be a single material, a fibres reinforced matrix, a sintered material or substance applied to the outer surface of the sliding pin 9. A dedicated friction mean should be used.

While for exactly fitting the sliding pin 9 to the pitch horn 8, a conical pin fixing washer 90 was used, other possibilities exist to fit the sliding pin 9. With the threaded end 92 with an associated male thread and the nut 91, here a castellated nut 91, the fixation of the sliding pin 9 is possible, wherein a linear movement of the sliding pin 9 relative to the ball 6 in the arm through hole 50 is possible. The detachable pin prevents the castellated nut 91 from coming loose.

The shown sliding pin 9 could comprise two tapered outer areas and a central thickened inner area, where the second sliding surface 63 is arranged, attached, or formed. The cross-section of the sliding pin 9 is smaller in the two tapered outer areas than in the central thickened inner area. An additional possibility is a design of the sliding pin 9 with one tapered outer area and a thickened outer area, including the central area.

Figure 4A:
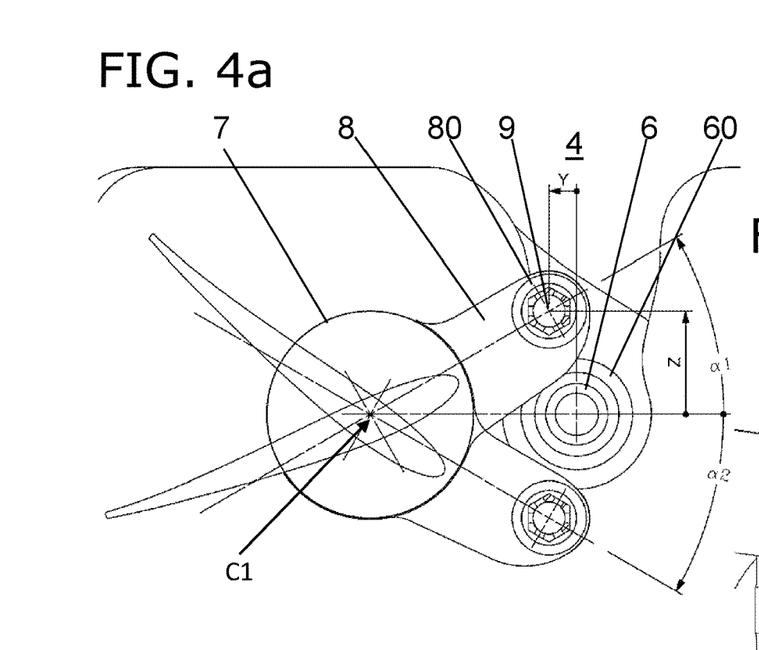
FIG. 4a depicts a side view of a pitch horn in different states, while the not connected pitch control unit arm is depicted in the background.
Figure 4B:
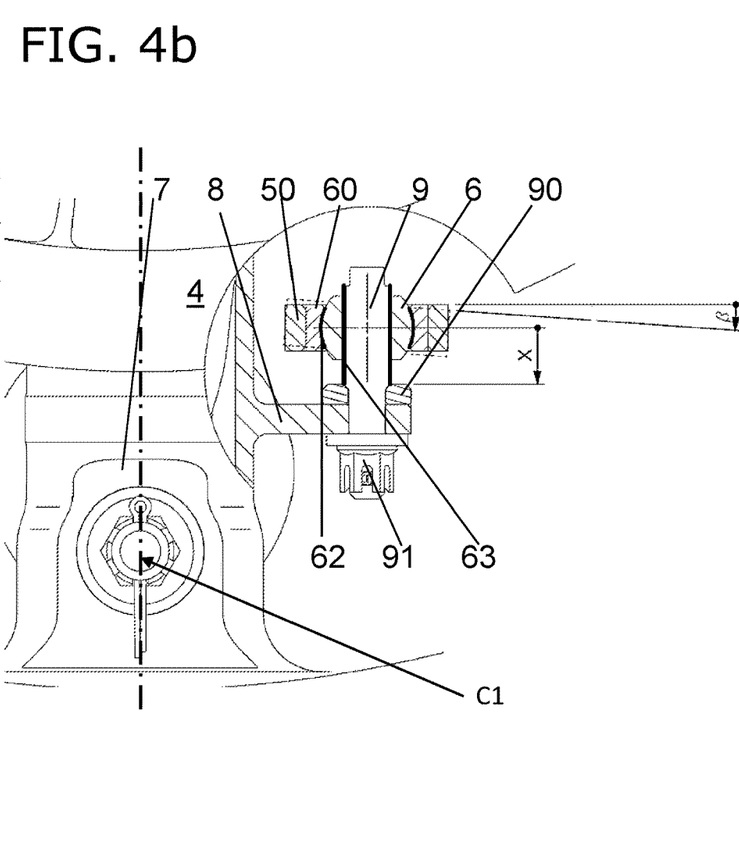
FIG. 4b depicts another partly cut detail top view of the connection between pitch horn and pitch control unit arm with a different section plane.

The schematics of movement of pitch horn 8 and blade holder 7 and the sliding pin 9 inside the spherical bearing are shown and roughly explained with reference to the various FIG. 4 in the following.

In operation, when a pilot applies yaw input, it is transferred through a control system to the pitch control unit 4, which moves by a distance Z. The direction of Z depends on the yaw signal direction. As the pitch control unit 4 is coupled through the sliding pin 9 with pitch horn 8, which is free to rotate around its axis C1, the blade holder 7 rotates or pivots by an angle $\alpha 1$ or $\alpha 2$ depending on the direction and magnitude of the distance Z.

The rotation or pivoting by angle $\alpha 1$ or $\alpha 2$ induces a displacement of axis of the sliding pin 9 by distance Y. It also forces the pitch control unit 4 to rotate around its axis C2, which equals a length axis L as depicted in FIG. 4c, and generates the rotation angle $\beta$ and a displacement X between pitch control unit arm 5 and therefore between ball 6 and pitch horn 8 with the sliding pin 9 fixed to the pitch horn 8.

The relative movement between the sliding pin 9 and the pitch control unit arm 5 due to the spherical bearing and sliding of the sliding pin 9 is realized as follows.

The rotation by $\alpha 1$ or $\alpha 2$ is realized on any of the two sliding surfaces: first sliding surface 62 and second sliding surface 63. The rotation or pivoting by $\beta$ is realized in the spherical bearing or ball 6 on the first sliding surface 62, while the displacement by X is realized on the second sliding surface 63. During rotation of the pitch control unit 4 in operation mode, as depicted FIG. 4c, the sliding pin 9 pivots by a small angle $\beta$, namely, below 30°.

Figure 4C:
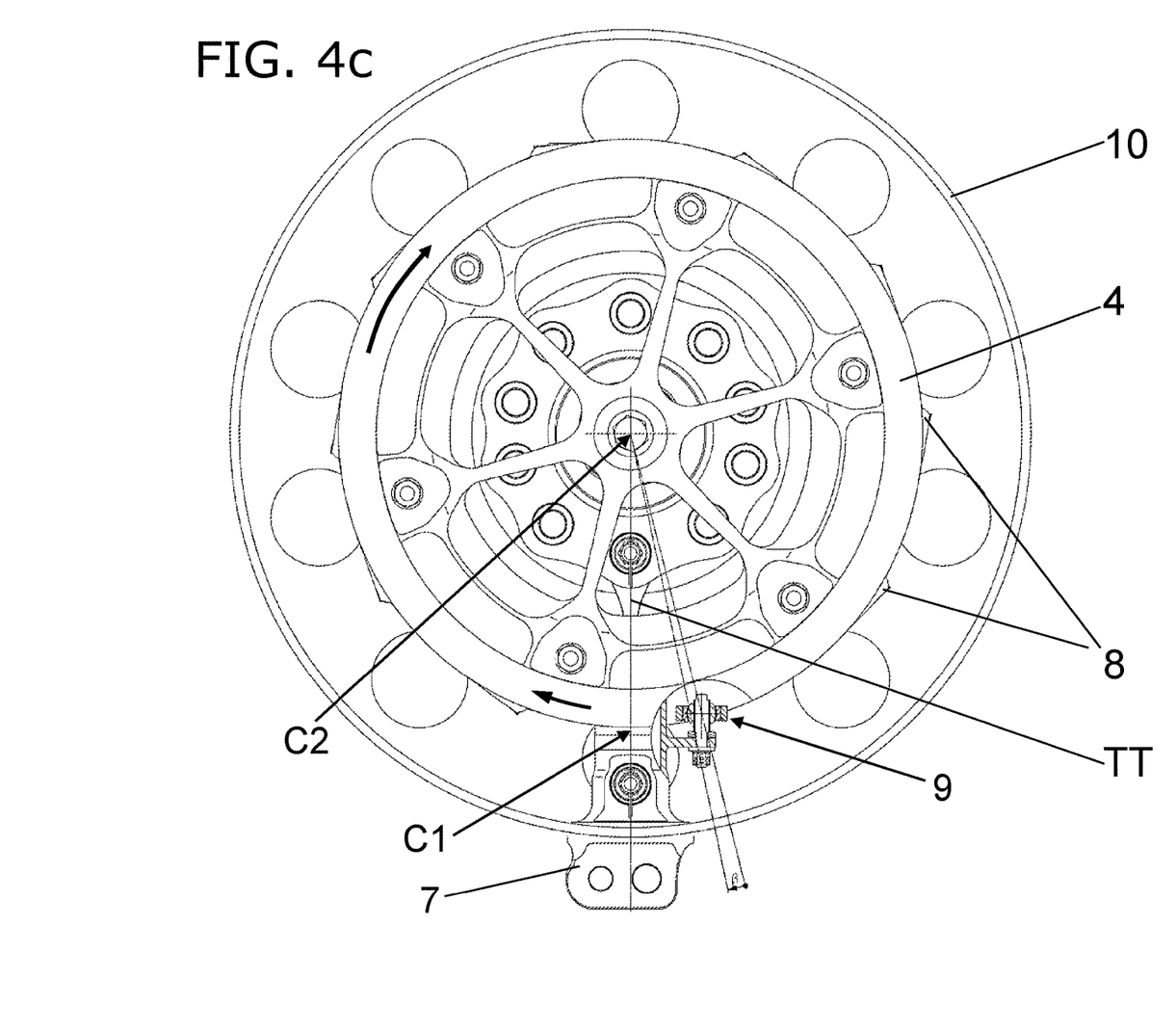
FIG. 4c depicts a top view inside the tail rotor head onto the pitch control unit, with indicated axes, angles and displacements of the sliding pin respectively the pitch control unit arm possible in operation.

In FIG. 4c, only rotation is indicated and no axial displacement along a length axis of the pin is depicted. This axial displacement has to be free as this motion is occurring. Prior art documents try to solve this by making parts flexible in this direction, this in order to not overload the parts by this forced displacement which is coming from the centrifugal force pulling the blade 2 out a bit and by the rotation of the blade holder 7 which changes the true distance from the rotor axis to the contact point to the spider. The spider rotates slightly relative to the rotor hub when applying some blade pitch.

The sliding surfaces 62, 63 are surfaces which allow sufficient sliding of the sliding pin 9 relative to the ball 6 or outer race 60 or ball through hole 61. The sliding surfaces 62, 63 should be sufficiently prepared for reaching sliding properties. A coating may be used so that the sliding surfaces 62, 63 or the used material have sufficient properties.

Sliding surfaces 62 and 63 shall be dedicated low friction, high wear resistant surfaces which could be composed of, but not limited to: dedicated low friction coatings applied on at least one of interfacing moving parts; a liner (fiber reinforced matrix) bonded/applied to at least one of the moving parts; a layer of plastic material or sintered material can be installed between moving parts or bonded/applied to at least one of moving parts.

The sliding surfaces 62 and 63 have to bear the pressure of the load and need to have a low frictional coefficient; coatings or material pairings typically have friction coefficients of below 0.15 and preferably below 0.1. An advantage of the disclosed invention is that the load is supported by a face and not by a point/line thus enabling use of a much wider range of coatings. Expensive, complicated, and very hard coatings, such as tungsten carbide, are known and used in the industry in order to cope with the locally very high contact pressures, which provides sufficient but not optimal service life due to wear.

Since the devices and methods described in detail above are examples of embodiments, they can be modified to a wide extent by the skilled person in the usual manner without departing from the scope of the invention. In particular, the mechanical arrangements and the proportions of the individual elements with respect to each other are merely exemplary. Some preferred embodiments of the apparatus according to the invention have been disclosed above. The invention is not limited to the solutions explained above, but the innovative solutions can be applied in different ways within the limits set out by the claims.

We claim:

1. A detachable connection between a pitch control unit arm and a pitch horn of a blade holder in a tail rotor head of a tail rotor of a rotary wing aircraft, the detachable connection comprising:

a pin connecting the pitch horn attached to the blade holder with the pitch control unit arm of a pitch control unit, the pin arranged to protrude through an arm through hole and at another edge through a pitch horn through hole;

wherein the pin is configured to be a sliding pin projecting between the pitch horn and the pitch control unit arm which is running in the course of a sliding pin's length through a spherical bearing in form of a ball with a central ball through hole; and wherein the ball and a part of the sliding pin are surrounded by an outer race of the spherical bearing, such that a sliding motion and a pivoting motion of the sliding pin inside the spherical bearing is enabled;

wherein the sliding pin comprises a threaded end and is arranged fixed with the threaded end at the pitch horn by a pin fixing washer and a nut wherein the sliding pin is held by the pin fixing washer between the pitch horn and the pitch control unit arm and protrudes through the pitch horn through hole and the ball through hole in the spherical bearing in the arm through hole.

2. The detachable connection according to claim 1, wherein at least one of a first sliding surface is formed at at least one of a ball outer surface and an inner surface of the outer race and/or a second sliding surface is formed at at least one of an outer surface of the sliding pin and an inner surface of the ball through hole such that a sliding motion along the first sliding surface of the ball relative to at least one of the outer race and the second sliding surface of the sliding pin relative to the ball through hole is enabled.

3. The detachable connection according to claim 2, wherein the first sliding surface is arranged attached or integrated at the ball outer surface and the second sliding surface is arranged attached or integrated at the outer surface of the sliding pin.

4. The detachable connection according to claim 3, wherein the second sliding surface is bonded or applied to the outer surface of the sliding pin and comprises a single material, a fibres reinforced matrix or a sintered material.

5. The detachable connection according to claim 2, wherein the second sliding surface is bonded or applied to the outer surface of the sliding pin and comprises a single material, a fibres reinforced matrix or a sintered material.

6. The detachable connection according to claim 5, wherein the pin fixing washer is configured as a conical washer.

7. The detachable connection according to claim 1, further comprising a split pin retention and wherein the nut comprises a castellated nut.

8. The detachable connection according to claim 7, wherein the ball and the outer race are arranged fixed in the arm through hole of the pitch control unit arm.

9. The detachable connection according to claim 1, wherein the ball and the outer race are arrange fixed in the arm through hole of the pitch control unit arm.

10. The detachable connection according to claim 1, wherein the pin fixing washer is configured as a conical washer.

11. The detachable connection according to claim 1, wherein the sliding pin features at least one tapered outer area in which a cross-section of the sliding pin is smaller than in a central thickened inner area of the sliding pin where the sliding surface is arranged, attached or formed.

12. A tail rotor head of a tail rotor of a rotary wing aircraft, the tail rotor head comprising:

a pitch control unit comprising a plurality of pitch control unit arms, a plurality of blade holder comprising connected tail rotor blades, and wherein each blade holder is connected to a respective pitch control unit arm of the plurality of pitch control unit arms via a detachable connection comprising a pin connecting a pitch horn attached to the blade holder with the pitch control unit arm of a pitch control unit, the pin arranged to protrude through an arm through hole and at another edge through a pitch horn through hole;

wherein the pin is configured to be a sliding pin projecting between the pitch horn and the pitch control unit arm which is running in the course of a sliding pin's length through a spherical bearing in a form of a ball with a central ball through hole;

wherein the ball and a part of the sliding pin are surrounded by an outer race of the spherical bearing, such that a sliding motion and a pivoting motion of the sliding pin inside the spherical bearing is enabled;

wherein the sliding pin comprises a threaded end and is arranged fixed with the threaded end at the pitch horn by a pin fixing washer and a nut;

wherein the sliding pin is held by the pin fixing washer between the pitch horn and the pitch control unit arm and protrudes through the pitch horn through hole and the ball through hole in the spherical bearing in the arm through hole.

13. The tail rotor head according to claim 12, wherein the sliding pin features at least one tapered outer area in which a cross-section of the sliding pin is smaller than in a thickened inner area of the sliding pin.

14. The tail rotor head according to claim 12, wherein the sliding pin features at least one tapered outer area in which a cross-section of the sliding pin is smaller than in a central thickened inner area of the sliding pin where the sliding surface is arranged, attached or formed.

15. A detachable connection between a pitch control unit arm and a pitch horn of a blade holder in a tail rotor head of a tail rotor of a rotary wing aircraft, the detachable connection comprising:

a pin connecting the pitch horn attached to the blade holder with the pitch control unit arm of a pitch control unit, the pin arranged to protrude through an arm through hole and at another edge through a pitch horn through hole;

wherein the pin is configured to be a sliding pin projecting between the pitch horn and the pitch control unit arm which is running in the course of a sliding pin's length through a spherical bearing in form of a ball with a central ball through hole; and wherein the ball and a part of the sliding pin are surrounded by an outer race of the spherical bearing, such that a sliding motion and a pivoting motion of the sliding pin inside the spherical bearing is enabled;

wherein the sliding pin comprises a threaded end and is arranged fixed with the threaded end at the pitch horn by a pin fixing washer and a nut, wherein the sliding pin is held by the pin fixing washer between the pitch horn and the pitch control unit arm and protrudes through the pitch horn through hole and the ball through hole in the spherical bearing in the arm through hole;

wherein the sliding pin features at least one tapered outer area in which a cross-section of the sliding pin is smaller than in a thickened inner area of the sliding pin.

* * * * *